(12) United States Patent
Nelson

(10) Patent No.: US 10,231,393 B2
(45) Date of Patent: Mar. 19, 2019

(54) ASSEMBLY FOR VERTICAL PLANT ARRAY

(71) Applicant: Mark Nelson, Victoria (CA)

(72) Inventor: Mark Nelson, Victoria (CA)

(*) Notice: Subject to any disclaimer, the term of this patent is extended or adjusted under 35 U.S.C. 154(b) by 157 days.

(21) Appl. No.: 15/327,591

(22) PCT Filed: Jul. 28, 2015

(86) PCT No.: PCT/CA2015/050715
§ 371 (c)(1),
(2) Date: Jan. 19, 2017

(87) PCT Pub. No.: WO2016/015152
PCT Pub. Date: Feb. 4, 2016

(65) Prior Publication Data
US 2017/0181393 A1    Jun. 29, 2017

Related U.S. Application Data

(60) Provisional application No. 62/031,313, filed on Jul. 31, 2014.

(51) Int. Cl.
*A01G 31/06* (2006.01)
*A01G 9/02* (2018.01)
*A01G 27/00* (2006.01)

(52) U.S. Cl.
CPC ............ *A01G 31/06* (2013.01); *A01G 9/023* (2013.01); *A01G 27/00* (2013.01)

(58) Field of Classification Search
CPC ......... A01G 31/06; A01G 31/02; A01G 31/00
See application file for complete search history.

(56) References Cited

U.S. PATENT DOCUMENTS

| 4,255,896 A | * | 3/1981 | Carl .................. A01G 31/06 47/62 C |
| 4,669,217 A | * | 6/1987 | Fraze ................ A01G 31/02 47/64 |
| 5,161,327 A | | 11/1992 | Campbell et al. |
| 5,826,375 A | | 10/1998 | Black |
| 5,860,247 A | * | 1/1999 | Newby ............ A01G 31/02 137/78.1 |
| 2009/0000189 A1 | | 1/2009 | Black |

FOREIGN PATENT DOCUMENTS

WO      2014106512 A1    10/2014

OTHER PUBLICATIONS

Canadian Intellectual Property Office "Patent Cooperaton Treaty International Search Report", dated Aug. 5, 2015, 4 pages.

* cited by examiner

*Primary Examiner* — Kristen C Hayes
(74) *Attorney, Agent, or Firm* — Tomlinson McKinstry, P.C.

(57) ABSTRACT

A modular array for growing plants consisting of horizontally extending tubes with plant openings, downspouts for conveying water from an upper tube to a lower tube and means for adjusting the height of water in each tube. Preferably, each downspout is movable within a mounting in the uppertube and the water height is adjusted by altering the height by which the downspout projects into the tube interior.

12 Claims, 7 Drawing Sheets

ASSEMBLY FOR VERTICAL PLANT ARRAY

FIELD OF THE INVENTION

The present invention relates to the field of structures for use in growing plants.

BACKGROUND OF THE INVENTION

Various structures for use in growing plants are known, including as described in the following US patent documents: U.S. Pat. No. 7,921,599, Irwin, Vegetation support system, 12 Apr. 2011; U.S. Pat. No. 5,826,375, Black, Modular planter studio, 27 Oct. 1998; U.S. Pat. No. 5,042, 196, Lukawski, Apparatus for cultivation, 27 Aug. 1991; U.S. Pat. No. 3,757,470, Shimamato, Apparatus for cultivation, 11 Sep. 1973; U.S. Pat. No. 6,502,350, Dick, Apparatus for cultivation, 7 Jan. 2003; U.S. Pat. No. 7,877,927, Roy, Modular hydroponic, 1 Feb. 2011; U.S. Pat. No. 7,832,144, Corradi, Hydroponic growing system, 16 Nov. 2010; U.S. Pat. No. 7,243,460, Darlington, Support for vertical plant matrix, 17 Jul. 2007; U.S. Pat. No. 8,689,485, Friedman, Vertical planter and gardening wall, 8 Apr. 2014; U.S. Pat. No. 8,365,466, Storey, Hydroponic display, 5 Feb. 2013; U.S. Pat. No. 7,926,224, Sotiri, Green planting wall, 19 Apr. 2011; U.S. Pat. No. 6,725,601, Chick, Vertical ecosystem, 27 Apr. 2004; U.S. Pat. No. 7,080,482, Bradley, Modular plant growing, 25 Jul. 2006; U.S. Pat. No. 6,634,138, Katzman, Self sustaining indoor waterfall, 31 Oct. 2003; U.S. Pat. No. 6,178,692, Graven, Lighting system for vertical garden, 30 Jan. 2001; U.S. Pat. No. 8,418,403, Nuttman, Hanging stacked plant holders, 16 Apr. 2013; and U.S. Pat. No. 7,627,983, Deutsch-Aboutmahassine, Modular wall mounted growing system, 8 Dec. 2009.

The Black patent (U.S. Pat. No. 5,826,375) discloses a modular planting system comprising a plurality of horizontally extending troughs suitable for supporting plant containers, each trough positioned one above the other, with a vertical drainage conduit connecting each pair of adjacent troughs. Each drainage conduit is affixed to the upper of the pair of adjacent troughs (e.g., "Conduit 32 may be integrally formed with trough 28 or it may individually constructed and lockingly inserted into trough 28 such as by means of glue or the like." Black, col. 4, lines 60-63). The upper end of each drainage conduit projects above the inner bottom of the relevant trough so as to define a maximum water depth in the trough, in that, water above the upper end of the drainage conduit flows down the drainage conduit.

SUMMARY OF THE INVENTION

Embodiments of the present invention include a scalable modular array for growing plants consisting of horizontally extending tubes with plant openings, downspouts for conveying water from an upper tube to a lower tube and means for adjusting the height of water in each tube. Preferably, each downspout is movable within a mounting in the upper tube and the water height is adjusted by altering the height by which the downspout projects into the tube interior.

In one aspect, the present invention provides an assembly for growing plants, the assembly including:
 a plurality of plant trays, each plant tray having:
 a recess for containing liquid when the plant tray is in use;
 a drain opening for permitting liquid to flow by gravity from the plant tray when in use; and
 a liquid-height adjustment for from time to time selectively setting a maximum liquid height in the recess;
 a tray support arrangement for locating the plant trays in a vertically displaced array wherein in use liquid from an upper plant tray may flow by gravity through the drain opening in the upper plant tray to the recess of a next lower plant tray, such that in use liquid provided to a top plant tray may flow to a bottom plant tray directly, or via a plant tray or plant trays interposed between the top plant tray and the bottom plant tray; and
 a liquid handling system, being means for providing liquid to the top plant tray and receiving liquid from the bottom plant tray;
 whereby, in use, the height of liquid in each plant tray may be adjusted independently of the other plant trays.

Each liquid-height adjustment may include a downspout movably engaged with the drain opening wherein an upper end of the downspout defines the maximum liquid height in the recess. The downspout may slidably engaged with the drain opening wherein the downspout may be moved directly up and down relative to the drain opening. The downspout may be threadedly engaged with the drain opening wherein the downspout may be rotated relative to the plant tray so as to be moved up and down relative to the drain opening.

Each plant tray may be a tube having a plurality of upward facing plant openings. Each plant opening may include growing-medium support. A resiliently flexible material may be disposed about each plant opening for use in releasably orienting a plant container therein. The tube may be cylindrical.

Each tube may have two ends and the tray support arrangement may include two opposed risers, each riser having a plurality of tube slots, each tube slot configured for releasably receiving a tube end and each tube slot aligned with a corresponding tube slot on the other riser.

Each plant tray may be longitudinally extending and each drain opening may be located in the vicinity of a drain end of the respective plant tray; the plant trays may be substantially identical one to the other; and the tray support arrangement may support the plant trays in a substantially vertical aligned assembly with the drain ends in an alternating arrangement, wherein liquid flowing through the drain opening of an above plant tray is received by the next lower plant tray in the vicinity of the end of the plant tray opposite the drain end; whereby liquid passing within the assembly flows the substantial length of each plant tray.

The liquid handling system may include: a reservoir for receiving liquid from the drain opening of the bottom plant tray; a pump having a pump inlet connected to the reservoir and a pump outlet; and an outlet conduit for conveying liquid from the pump outlet to the top plant tray; whereby, in use, the pump circulates liquid through the assembly.

The pump may be configured for continuous operation. The tray support arrangement may include a base and the reservoir and the pump may be located in the base.

The assembly may include a liquid temperature control device for affecting the temperature of liquid within the reservoir. The liquid temperature control device may include: a sub-reservoir contained within the reservoir and a Peltier device having heat exchanger fins projecting into the sub-reservoir.

The reservoir and pump may be located remote from the plant trays; and the liquid handling system may include an inlet conduit for conveying liquid from the bottom plant tray to the reservoir.

The tray support arrangement may be movable; the inlet conduit may include a plurality of inlet connections; the outlet conduit may include a plurality of outlet connections;

and each inlet connection may be paired with an outlet connection, with each such pair defining a connection location; wherein the tray support arrangement and plant trays may from time to time be moved by the user from one to another of the connection locations.

In another aspect, the present invention provides an assembly for growing plants, the assembly includes:
a plurality of cylindrical tubes, each tube having:
 a closure at each tube end defining with the tube inner walls a recess for containing liquid when the tube is in use;
 a drain opening for permitting liquid to flow by gravity from the tube when in use;
 a liquid-height adjustment for from time to time selectively setting a maximum liquid height in the recess comprising a downspout movably engaged with the drain opening wherein an upper end of the downspout defines the maximum liquid height in the recess; and
 a plurality of upward facing plant openings;
a tube support arrangement for locating the tubes in a vertically displaced array wherein in use liquid from an upper tube may flow by gravity through the drain opening in the upper tube to the recess of a next lower tube, such that in use liquid provided to a top tube may flow to a bottom tube directly, or via a tube or tubes interposed between the top tube and the bottom tube, the tube support arrangement comprising;
 a base; and
 two opposed risers affixed to, and projecting upwards from, the base, each riser having a plurality of tube slots, each tube slot configured for releasably receiving a tube end and each tube slot aligned with a corresponding tube slot on the other riser;
a liquid handling system, being means for providing liquid to the top tube and receiving liquid from the bottom tube, the liquid handling system comprising:
 a reservoir located in the base for receiving liquid from the drain opening of the bottom tube;
 a pump located in the base and having a pump inlet connected to the reservoir and a pump outlet; and
 an outlet conduit for conveying liquid from the pump outlet to the top tubetray;
whereby, in use, the maximum height of liquid in each tube may be adjusted independently of the other tubes.

The downspout may be slidably engaged with the drain opening wherein the downspout may be moved directly up and down relative to the drain opening.

DETAILED DESCRIPTION WITH REFERENCE TO THE DRAWINGS

Figure 1:
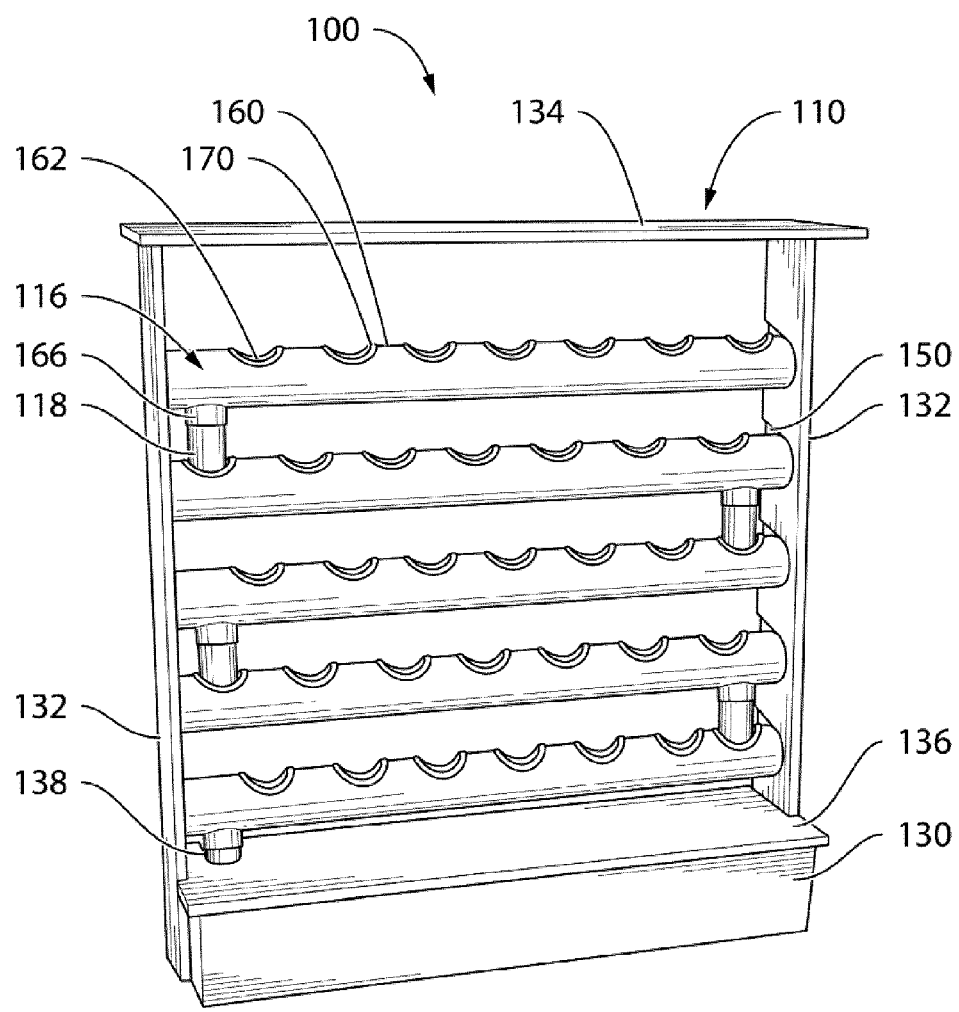
FIG. 1 is front perspective view of a vertical array assembly embodiment of the present invention.
Figure 2:
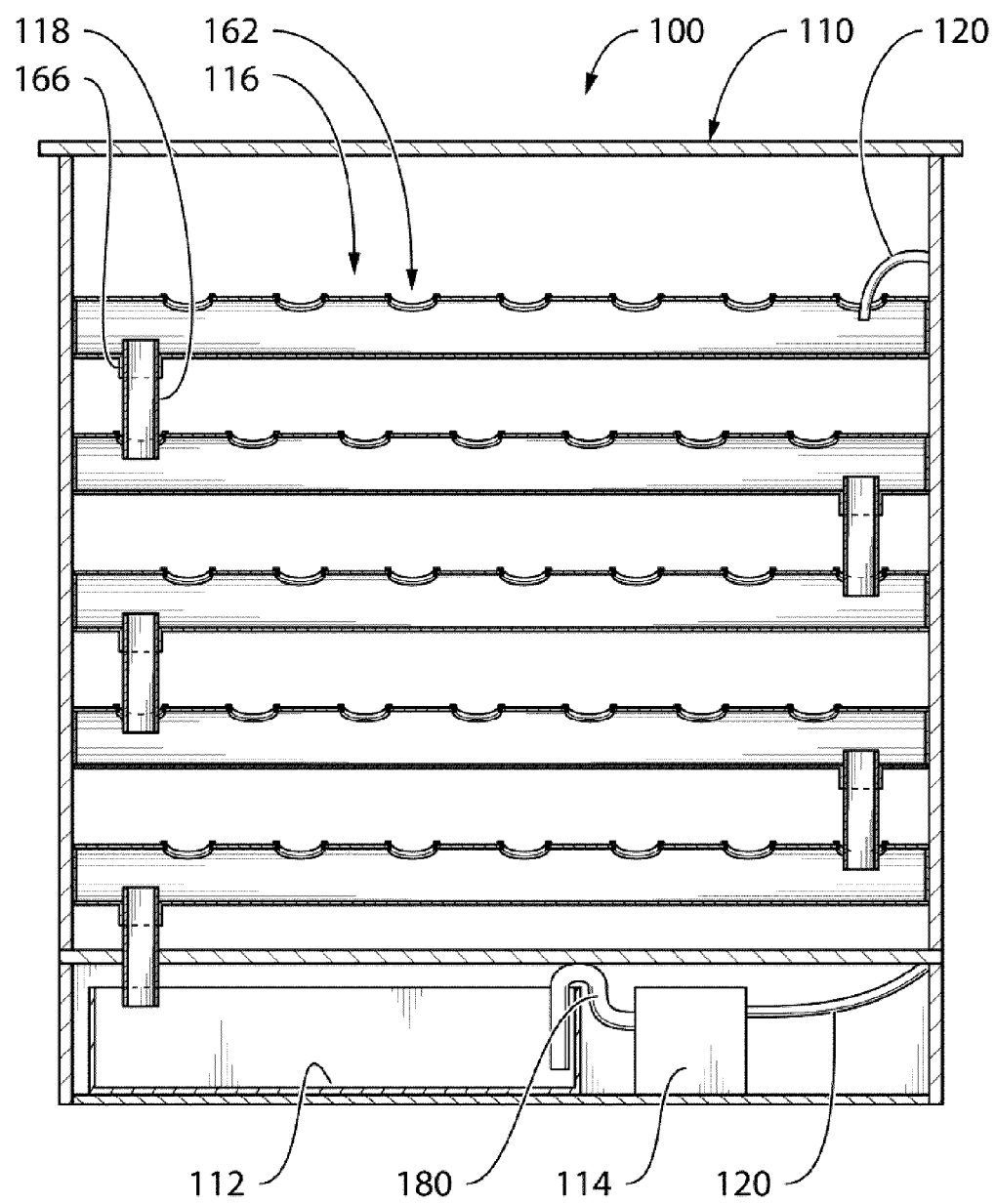
FIG. 2 is a front elevation sectional view of the vertical array assembly embodiment shown in FIG. 1.
Figure 3:
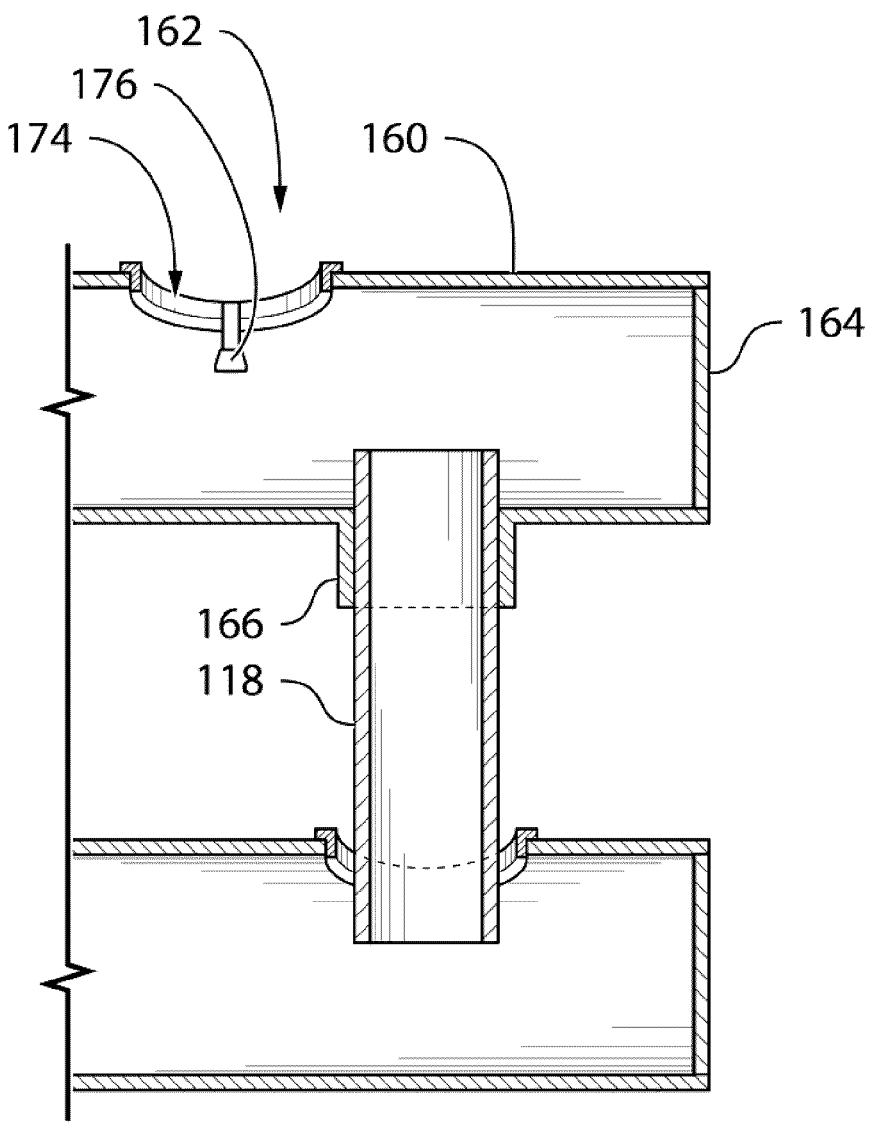
FIG. 3 is front elevation sectional isolation view showing an exemplary downspout and plant support.
Figure 4:
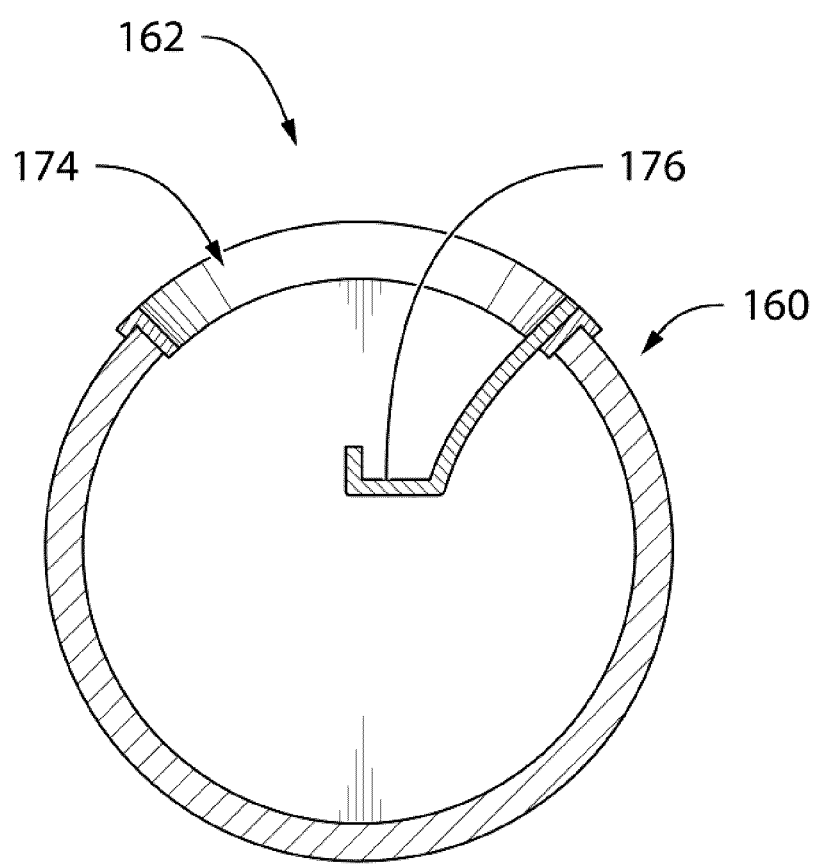
FIG. 4 is a side elevation sectional isolation view showing the plant support of FIG. 3.
Figure 5:
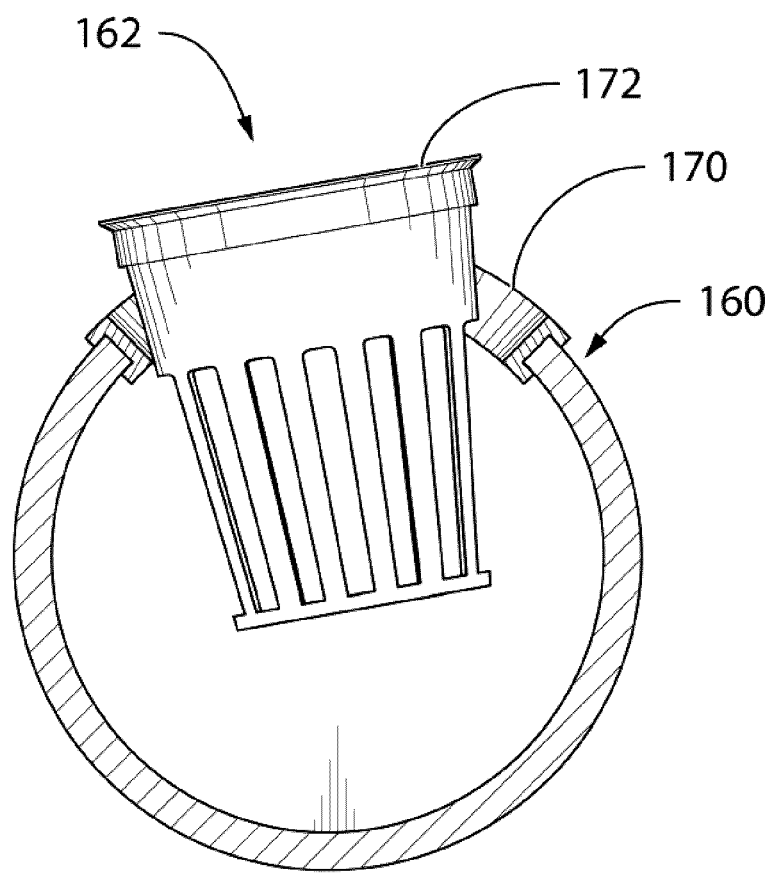
FIG. 5 is a side elevation sectional isolation view showing a gasket and basket installed in a plant opening.

As shown in the drawings, embodiments of the present invention include a vertical array assembly 100 intended for hydroponic gardening having: a frame 110, reservoir 112, pump 114, a plurality of growing tubes 116, a plurality of downspouts 118 and a supply hose 120.

The frame 110 includes a base 130, two risers 132 and a top plate 134. The base 130 houses the reservoir 112 and pump 114. The base top 136 includes a base top opening 138 for receiving a downspout 118, so as to permit flow from the downspout 118 to the reservoir 112. The base top 136 upper surface is contoured so as to direct liquid landing on the base top 136 into the base top opening 138 and thus into the reservoir 112, so as to control spills or leakages.

The risers 132 are affixed to the base 130 in an upward-projecting opposed arrangement. Each riser 132 includes a plurality of tube slots 150 for receiving and supporting an end of a growing tube 116. The top plate 134 spans the upper ends of the risers 132.

Each growing tube 116 includes a tube body 160, a plurality of plant openings 162, two tube-end caps 164, and a downspout sleeve 166. In the embodiment shown in the drawings, the tube-end caps 164 are permanently attached to the tube bodies 160. It has been found that the plant openings 162 and downspout sleeve 166 provide sufficient access for any required internal cleaning of a growing tube 116. However, one or both of the tube-end caps 164 could be removable, for example, the tube-end caps 164 could be in threaded engagement with the tube bodies 160.

The plant openings 162 are in a spread-out aligned arrangement along one side of the tube body 160. The plant openings 162 are preferably elongated in a direction lateral to the longitudinal extension of the tube body 160 so as to facilitate tilting of a plant within the plant opening 162. Alternatively, the plant openings 162 may be circular, i.e., defined by the intersection of the tube body 160 with an imaginary cylinder with an axis of rotation normal to the longitudinal axis of the tube body 160. Such circular plant openings 162 may be offset from opening directly upward, so as to provide the tilting of the plants. However, such an offset would require that there be two types of growing tubes 116, essentially mirror images of each other, so as to enable all plants to be tilted to the front, in the embodiment shown in the drawings. For simplicity of manufacture, it would presumably be preferable for there to be only a single type of growing tube 116. i.e. one with elongated plant openings 162 as described above, for each size of vertical array assembly 100.

Each plant opening 162 may be lined with a gasket 170, being a U-shaped flexible material (e.g., vinyl or rubber) friction fit in the plant opening 162. The gaskets 170 assist in securing a basket 172 (i.e., a plant container having a plurality of holes so as to permit the plant's roots to extend from the basket 172), in the plant opening 162.

Alternatively, each plant opening 162 may have affixed thereto a plant support 174, having a hook 176 projecting within the growing tube 116 for supporting a growing medium suitable for the vertical array assembly 100, (e.g., rockwool).

Alternatively, a ledge (not shown in the drawings) may be positioned below each plant opening 162 so as to support a basket 172 or uncontained rock wool, as the case may be. In any event, it is understood that it is desirable to locate the growing medium so the water is generally maintained at a desirable level to keep the growing medium wet for the roots but not high enough to contact the stem of the plants (which can result in rot).

In rare instances, for example if a plant had a root mass that was so dense as to significantly impede the flow of water within a growing tube 116, it may be desirable to include within the growing tube 116, water bypass channels (not shown) below each plant opening 162. Between such bypass channels there may be ridges to agitate the water and create eddies.

Each downspout sleeve 166 is affixed to the respective tube body 160 on the side of the tube body 160 opposite the plant openings 162 and proximate an end of the tube body 160.

Each downspout 118 is configured for engagement within a respective downspout sleeve 166, such that the user may move the downspout 118 longitudinally (i.e., in use, up or down), within the downspout sleeve 166. The downspouts 118 have a smaller diameter than the tube bodies 160. Thus the upper end of each downspout may be positioned so as to project upward into the interior of the respective tube body 160, thus forming a "dam" or "weir".

The fit between each downspout 118 and downspout sleeve 166 may be sufficiently close such that friction retains the downspout 118 in the position selected by the user, while permitting the user to move the downspout 118 directly longitudinally within the downspout sleeve 166 and. Alternatively, each downspout 118 may be threadedly engaged with the downspout sleeve 166, such that the downspout 118 may be rotated relative to the downspout sleeve 166 so as to move the downspout 118 longitudinally within the downspout sleeve 166.

A suitable sealing means is desirable, i.e., a sealing means that prevents or at least significantly impedes leakage of liquid between each downspout sleeve 166 and downspout 118, while permitting relative longitudinal/rotational movement as between the downspout sleeve 166 and downspout 118. Food-grade grease been found to be a suitable sealing means. Alternatively, an "O" ring or other conventional sealing means may be used.

Preferably, each downspout sleeve 166 and downspout 118 combination has markings (or other suitable indicators) indicating the relative longitudinal position of the downspout sleeve 166 and downspout 118, and thus the amount by which the upper end of the downspout 118 projects into the interior of the growing tube 116.

The downspout sleeve 166 and downspout 118 combination is understood to be the preferred configuration for affecting water height within a growing tube 116 in that the combination enables the user to make fine adjustments to the water height without having to move or otherwise disturb plants in the growing tube 116. However, other means for adjusting the height of water may be possible. For example, a weir insert (not shown) could be used to provide a discrete pre-set water height within a growing tube 116. The weir insert and interior of the growing tube 116 would be configured to releasably secure the weir insert in the desired location (i.e., between the downspout sleeve 166 and the immediately adjacent plant opening 162), with a seal between the weir insert and interior of the growing tube 116 adequate (in terms of the flow rate provided by the pump 114) to impede the flow of water between the weir insert edges and the interior of the growing tube 116, such that sufficient water is retained by the weir insert that water overtops the weir insert. Such a weir insert might be used if the vertical array assembly 100 were used to grow only one type of plant requiring only two discrete water levels (i.e., higher when the plant is getting established and lower when the roots are established). Alternatively, there could be additional weir inserts sized to provide different discrete water heights, for use with different types of plants and plants for which optimal growth is achieved with more than two discrete water heights.

In use, the lower end of each downspout 118 is positioned in a loose fit in a plant opening 162 of the next lower growing tube 116, or in the base top opening 138, as the case may be.

The pump 114 is preferably a conventional electric-powered water/liquid pump. The pump 114 shown in the drawings has a suction hose 180 running between the vicinity of the bottom of the reservoir 112 and the suction side of the pump 114. Alternatively, an immersion-type pump may be used, i.e., a pump that in use is immersed in the reservoir 112, and thus does not require a suction hose 180. The supply hose 120 extends from the output side of the pump 114 to the plant opening 162 at the end of the top growing tube 116 opposite the downspout sleeve 166. As algae may grow within the supply hose, for aesthetic reasons, the supply hose 120 is preferably opaque.

In use, young plants or seeds are placed in the plant openings 162 (secured as described above), water (preferably containing dissolved materials for assisting plant growth) is provided to the reservoir 112 and the pump 114 is started. The pump 114 draws water from the reservoir 112 and supplies it to the top growing tube 116 via the supply hose 120. The water level rises in the top growing tube 116 until the water overtops the upper end of the downspout 118 when the water starts to flow down the downspout 118 to the next-below growing tube 116. This is repeated for each growing tube 116, culminating in the water in the lowermost growing tube 116 overtopping the lowermost downspout 118 and flowing into the reservoir 112.

The user may control the depth of water in each growing tube 116 by adjusting the amount by which the relevant downspout 118 projects into the growing tube 116. For example, when a growing tube 116 contains young plants (i.e., without a well-developed root structure), the downspout 118 may be positioned so as to maintain a higher water level than when the plants are older (i.e., have a more well-developed root structure). The ability to adjust the water level in each growing tube 116 independent of the other growing tubes 116, enables the user to concurrently grow plants with different water requirements (e.g., different types of plants and/or plants at different stages of development).

It is understood that the flow of water through the vertical array assembly 100, and the associated agitation of the water, tends to aerate the water. In particular, the falling of the water within each downspout 118 is understood to significantly contribute to aeration of the water. Such aeration is useful in that sufficient oxygen in the water is of benefit to the plants, for example in resisting root rot.

The interior of each downspout 118 may be configured to enhance aeration, for example: by having a feature or features proximate the upper end of the downspout 118 tending to cause the water to fall away from the interior wall of the downspout 118, for example an inward projecting ridge; and/or by having channels or other features to agitate the water or cause it to fall and splash against surfaces.

It is understood that in terms of maintaining the water level selected by the user in each growing tube 116 and optimizing aeration, that continuous circulation of water is desirable. However, intermittent circulation could be used if considered desirable for other reasons (for example to give the roots a chance to "breathe the air" which is understood to assist in reducing the likelihood of root rot), though this would presumably require a programmable controller for the pump 114.

Figure 6:
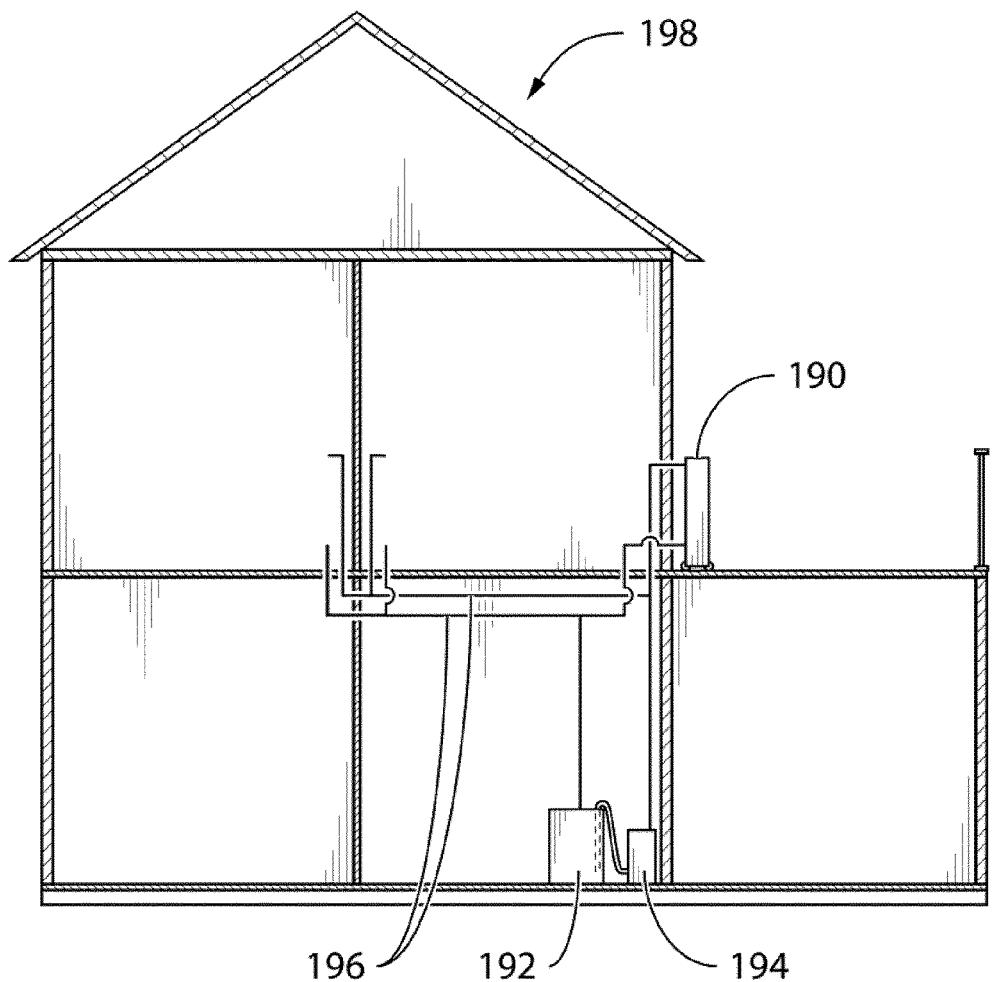
FIG. 6 is a schematic representation of a home built-in water system embodiment of the present invention.

As shown in FIG. 6, embodiments of the present invention include arrangements with built-in water systems having: a portable (presumably mounted on wheels) growing tube stack 190 (in which the growing tubes 116 are arranged as described above); a remote reservoir 192 and remote pump 194, presumably located in a utility or laundry room or similar; and built-in piping 196 for circulating water between the remote reservoir 192 and the growing tube stack 190. As indicated in the exemplary installation in a house 198 shown in FIG. 6, the built-in piping 196 preferably branches to a plurality of locations (both indoor and outdoor) wherein: a plurality of growing stacks 190 may be conveniently supplied from a single remote reservoir 192; or one or more growing tube stacks 190 may be moved between different locations as desired by the user. Preferably, the growing tube stacks 190 are releasably connectable (preferably with conventional quick release fasteners that close on detachment so as to maintain line pressure while reducing spillage and/or leakage, or similar) at each of the locations.

Locating the remote reservoir 192 in a laundry or utility room would presumably result in the remote reservoir 192 being away from direct sunlight, thus reducing evaporation and possible overheating of the water supplied to the plants. Further, locating the remote reservoir 192 in a laundry or utility room may enable the user to implement active water temperature control, by either cooling or heating the water as considered desirable. As well, locating the remote reservoir 192 in a laundry or utility room would permit flow-controlled connection to the building water supply so as to provide automatic water replenishment to the reservoir to replace water lost to evaporation or taken up by the plants. Further, locating the remote reservoir 192 in a laundry or utility room would facilitate implementing sophisticated aspects of hydroponic gardening, including: an automatic timer, ph tester, climate control heater/cooler, and ppm meter (parts per million) to add more nutrients when needed automatically. This would enable the user to leave the plants untended for reasonably extended periods, for example, for a month or more as the plants root and complete the first stage of their lives.

The frame 110 may be on wheels (presumably casters) to facilitate re-orienting or moving the vertical array assembly 100. The reservoir 112 and pump 114 are preferably removable from the base 130 to facilitate cleaning and servicing. The base 130 and other components may be sized and configured such that the other components may be disassembled and stored within the base 130 when not in use.

The vertical array assembly 100 may include "facade pieces", being faux downspouts opposite the functional downspouts 118, to provide a more balanced appearance.

Embodiments of the invention may be configured for either indoor or outdoor use or for both. An indoor/outdoor or outdoor embodiment may include: a transparent/translucent plastic cover to provide a greenhouse effect; netting to help keep the pests away; a fabric cover for shade/wind protection; and fencing to help support the plants particularly vegetable plants that bear heavy. Preferably, all of these would snap-on to the same snaps frame 110. Diverting rain water would also be an option.

In some applications, it may be desirable to have clips on the outside of the growing tubes 116 that would allow for a piece of material or a visor to be attached to each growing tube to create shade and keep the growing tube 116 out of direct sunlight.

The growing tubes 116 may be supported by means other than the frame 110. For example, each growing tube could be affixed directly to a wall or other vertical surface. Alternatively, the growing tubes 116 could be supported by components affixed to a wall or other vertical surface (for example, conventional wall mounted shelving components. As a further alternative, the growing tubes 116 could be suspended from above, for example by wire or cord.

The growing tubes 116 could be installed lengthwise along a railing, for example the balcony railing of an apartment, in locations where there is plenty of sun on the railing and less than desirable sun elsewhere. Once the water is elevated the only limit to the length of an assembly installed along a railing would be the height required for the transition from one growing tube 116 to the next.

The vertical array assembly 100 may incorporate a sensor to test the fertilizer content of the water (such sensors are readily available) connected to a fertilizer feed mechanism to automatically add fertilizer to the reservoir 112.

One or more solar panels may be affixed to the components of the vertical array assembly 100 to help power the pump 114 and/or optional refrigeration/heating unit and pump, with clean renewable energy. The solar panels may also serve as a blind to keep the components from direct sunlight. The solar panels may be moveable between different locations for optimum generation of electricity, responsive to the location of the vertical array assembly 100 and plant growth (e.g., solar panels initially mounted to the growing tubes 116 could be moved the sides of frame 110 once the plants overhang the panels).

Figure 7:
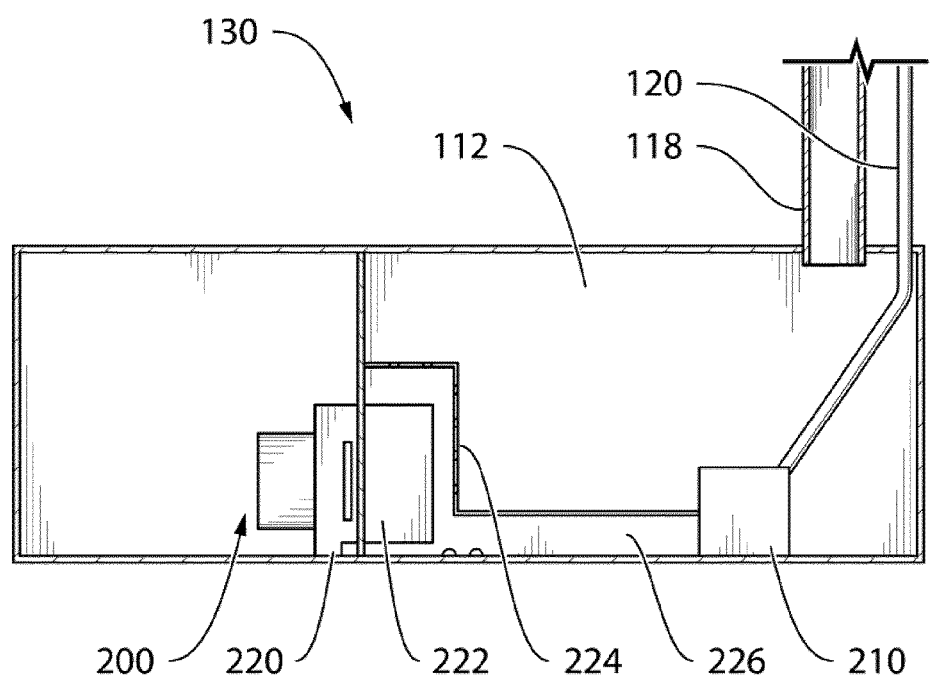
FIG. 7 is a front elevation sectional isolation schematic representation of a base embodiment having a cooling assembly.

As illustrated in FIG. 7, embodiments of the present invention may include a cooling assembly 200 for cooling the water being circulated within the vertical array assembly 100 so as to reduce losses due to evaporation and reduce the possibility of stress to the plants due to the water temperature becoming too high (e.g., as a result of heating due to prolonged exposure to direct sunlight). In FIG. 7, the cooling assembly 200 is shown with an immersion-type pump 210, but the cooling assembly 200 could also be used with a pump 114 as previously described.

The cooling assembly 200 includes an electrically-driven cooling means 220, a heat exchanger 222, a sub-reservoir enclosure 224 and a sub-reservoir-to-pump conduit 226.

The electrically-driven cooling means 220 is preferably a Peltier device, in which case the heat exchanger 222 is an array of metal plates (preferably of high heat conductivity). Alternatively, the electrically-driven cooling means 220 may be another form of cooling means such as a conventional vapor compression refrigeration device, in which case the heat exchanger 222 would presumably include the evaporator component of the vapor compression refrigeration device. The electrically-driven cooling means 220 may include a fan for dissipating into the air heat captured from the reservoir 112. The electrically-driven cooling means 220 may be configured to be powered by direct current (DC) as this simplifies powering the electrically-driven cooling means 220 with one or more solar panels.

The sub-reservoir enclosure 224 is an enclosure around the heat exchanger 222 configured to permit constrained flow, e.g., by perforations, between the interior of sub-reservoir enclosure 224 and the rest of the interior of the reservoir 112, so as to impede mixing of the water within the sub-reservoir enclosure 224 with the water outside of the sub-reservoir enclosure 224, such that, in use, the water within the sub-reservoir enclosure 224 tends to be cooled more than the water outside of the sub-reservoir enclosure 224.

The sub-reservoir-to-pump conduit 226 is a flow path between the interior of the sub-reservoir-to-pump conduit 226 and the suction side of the immersion-type pump 210, such that in use the immersion-type pump 210 pumps the cooler water to be found within the sub-reservoir enclosure 224.

Embodiments of the present invention may usefully be fitted with grow lights, preferably LED grow lights, as they use less electricity and generate less heat than conventional grow lights.

What is claimed is:

1. An assembly for growing plants, the assembly comprising:
   a plurality of plant trays including a top plant tray and a bottom plant tray, each plant tray having:
      a recess for containing liquid when the plant tray is in use;
      a drain opening for permitting liquid to flow by gravity from the plant tray when in use; and
      a liquid-height adjustment for selectively setting a maximum liquid height in the recess;
   a tray support arrangement for locating the plant trays in a vertically displaced array wherein in use liquid from an upper plant tray may flow by gravity through the drain opening in the upper plant tray to the recess of a next lower plant tray, such that in use liquid provided to the top plant tray may flow to the bottom plant tray directly, or via one or more of the plant trays interposed between the top plant tray and the bottom plant tray; and
   a liquid handling system, being means for providing liquid to the top plant tray and receiving liquid from the bottom plant tray;
   whereby, in use, the height of liquid in each plant tray may be adjusted independently of the other plant trays;
   wherein each liquid-height adjustment means comprises a downspout movably engaged with the drain opening wherein an upper end of the downspout defines the maximum liquid height in the recess and wherein the downspout is slidably engaged with the drain opening wherein the downspout may be moved directly up and down relative to the drain opening;
   wherein each plant tray comprises a tube having a plurality of upward facing plant openings; and
   wherein each tube has two ends and the tray support arrangement comprises two opposed risers, each riser having a plurality of tube slots, each tube slot configured for releasably receiving a one of the tube ends and each tube slot aligned with a corresponding one of the tube slots on the other riser.

2. The assembly of claim 1, wherein each plant opening comprises a growing-medium support.

3. The assembly of claim 1, wherein a resiliently flexible material is disposed about each plant opening for use in releasably orienting a plant container therein.

4. The assembly of claim 1, wherein the tube is cylindrical.

5. The assembly of claim 1, wherein:
   each plant tray is longitudinally extending and each drain opening is located in the vicinity of a drain end of the respective plant tray;
   the plant trays are substantially identical one to the other; and
   the tray support arrangement supports the plant trays in a substantially vertical aligned assembly with the drain ends in an alternating arrangement, wherein liquid flowing through the drain opening of an above plant tray is received by the next lower plant tray in the vicinity of the end of the plant tray opposite the drain end;
   whereby liquid passing within the assembly flows the substantial length of each plant tray.

6. The assembly of claim 1, wherein the liquid handling system comprises:
   a reservoir for receiving liquid from the drain opening of the bottom plant tray;
   a pump having a pump inlet connected to the reservoir and a pump outlet; and
   an outlet conduit for conveying liquid from the pump outlet to the top plant tray;
   whereby, in use, the pump circulates liquid through the assembly.

7. The assembly of claim 6, wherein the tray support arrangement comprises a base and the reservoir and the pump are located in the base.

8. The assembly of claim 6, further comprising a liquid temperature control device for affecting the temperature of liquid within the reservoir.

9. The assembly of claim 8, wherein the liquid temperature control device comprises: a sub-reservoir contained within the reservoir and a Peltier device having heat exchanger fins projecting into the sub-reservoir.

10. The assembly of claim 6, wherein:
    the reservoir and pump are located remote from the plant trays; and
    the liquid handling system further comprises an inlet conduit for conveying liquid from the bottom plant tray to the reservoir.

11. An assembly for growing plants, the assembly comprising:
    a plurality of cylindrical tubes, each tube having:
       a closure at each tube end defining with the tube inner walls a recess for containing liquid when the tube is in use;
       a drain opening for permitting liquid to flow by gravity from the tube when in use;
       a liquid-height adjustment for selectively setting a maximum liquid height in the recess comprising a downspout movably engaged with the drain opening wherein an upper end of the downspout defines the maximum liquid height in the recess; and
       a plurality of upward facing plant openings;
    a tray support arrangement for locating the tubes in a vertically displaced array wherein in use liquid from an upper tube may flow by gravity through the drain opening in the upper tube to the recess of a next lower tube, such that in use liquid provided to a top tube may flow to a bottom tube directly, or via a tube or tubes interposed between the top tube and the bottom tube, the tray support arrangement comprising;
       a base; and
       two opposed risers affixed to, and projecting upwards from, the base, each riser having a plurality of tube slots, each tube slot configured for releasably receiving a tube end and each tube slot aligned with a corresponding tube slot on the other riser;
    a liquid handling system, being means for providing liquid to the top tube and receiving liquid from the bottom tube, the liquid handling system comprising:

a reservoir located in the base for receiving liquid from the drain opening of the bottom tube;

a pump located in the base and having a pump inlet connected to the reservoir and a pump outlet; and an outlet conduit for conveying liquid from the pump outlet to the top tube;

whereby, in use, the height of liquid in each tube may be adjusted independently of the other tubes.

12. The assembly of claim 11, wherein the downspout is slidably engaged with the drain opening wherein the downspout may be moved directly up and down relative to the drain opening.

\* \* \* \* \*